United States Patent Office 2,912,430
Patented Nov. 10, 1959

2,912,430

METHOD OF PREPARING ESTERS OF CELLULOSE ETHER CARBOXYLIC ACIDS

Horst Kosche, Dusseldorf-Holthausen, Germany, assignor to Henkel & Cie., G.m.b.H., Dusseldorf-Holthausen, Germany, a corporation of Germany No Drawing. Application December 6, 1955
Serial No. 551,217

Claims priority, application Germany December 7, 1954

6 Claims. (Cl. 260—226)

It is known to prepare esters of organic acids by treating the acids with the alcohol intended for the esterification in the presence of strong inorganic acids. It has also been attempted to apply this method to the preparation of esters of macromolecular acids, for instance of alginic acid. However, it was found in this connection that the esterification can be carried out only with extensive degradation. Therefore, the extensively degraded products which are obtained from alginic acid can scarcely still be considered esters of alginic acid.

It was surprisingly found that cellulose ether carboxylic acids can be esterified by treatment with alcohols in the presence of strong acids without any substantial degradation taking place. Since also cellulose and the ether carboxylic acids prepared therefrom are known to be degradated by acid, this is a finding which was in no way to be expected.

The salts corresponding to the cellulose ether carboxylic acids used as starting materials are obtained for instance by reacting alkali cellulose with halogenated carboxylic acids, and particularly with α-halogen carboxylic acids or with their salts or by reacting cellulose with nitriles of unsaturated carboxylic acids, particularly with acrylonitrile and saponifying the nitrile group. The cellulose ether carboxylic acids to be employed may contain 2 to 4 carbon atoms in the ether carboxylic acid radical. There is preferably used cellulose glycolic acid which is also known under the name of carboxymethylcellulose and is available on the market in the form of the salt. The free acids are obtained from their salts in accordance with known methods.

Cellulose ether carboxylic acids can be prepared in the most varied degrees of substitution, there being understood by this the number of ether carboxylic acid radicals present per glucose unit. The extent of the reaction can be very small so that the alkali salts of the corresponding cellulose ether carboxylic acids are still water insoluble; however, it may also extend to the theoretically possible maximum value. Accordingly, cellulose ether carboxylic acids having degrees of substitution within the range of 0.1 to 3 can be used. Of particular importance are technically easily accessible cellulose ether carboxylic acids such as cellulose glycolic acids with degrees of substitution of 0.5 to 1.3 and preferably from 0.5 to 0.9.

For the esterification of these ether carboxylic acids, there may be employed mono or multivalent, particularly aliphatic alcohols and especially those containing primary hydroxyl groups. The alcohols to be treated may be of low or high molecular weight and contain for instance 1–15 or preferably 1–6 carbon atoms in the molecule. For instance, methyl, ethyl, propyl, butyl, hexyl, octyl, decylalcohols, glycols, polyglycol ether, glycerine and partial ethers of the said polyvalent and particularly bi- or trivalent alcohols can be used as esterification components. Any desired mixtures of these alcohols can also be employed.

As esterification catalysts there are used strong preferably inorganic acids, such as $HCl$, $HBr$, $HClO_4$, $H_3PO_4$. While sulfuric acid will catalyze the esterification, this acid is of lesser practical importance due to its undesired action on the cellulose. The same is true of nitric acid. The concentration of the acid in the alcohol during the esterification reaction should be at least 0.5% by weight and preferably 3 to 6% by weight. In general, it is not necessary to go beyond 10% by weight.

The cellulose ether carboxylic acid to be esterified can be used in moist state. If the ether carboxylic acids have been prepared by treating their salts, possibly dissolved in water, with aqueous acids, it is advisable to remove to a substantial extent the water adhering to the acids, which can be effected for instance by squeezing off the moist cellulose ether carboxylic acid or washing with water-soluble organic solvents and particularly with lower alcohols or ketones or by drying at temperatures of at most 100° C. and preferably not more than 70° C. The acids used for the esterification should not contain more than 50% by weight of water and preferably less than 25% by weight of water. In general, it is sufficient to dry the cellulose ether carboxylic acids only to such an extent that they are free from externally adhering water and appear dry. However, it is not advisable to decrease the water content of the acid to be esterified to less than 8% by weight although such acids may also be employed.

If neutral salts are still present in the free acids, they may be removed before the reaction, for instance by washing with water or with water-containing organic solvents, and particularly with lower alcohols. Finally, there may also be added to the alcohol serving for the esterification so much acid that after neutralization of the free alkali which may possibly still be present in the reaction product and after the liberation of the ether carboxylic acid groups which were formerly bound in the form of salts, sufficient acid is still present in the reaction mixture to catalyze the esterification. In this case, the preparation of the free acid from its salts is bound up with the addition of the alcohol component and this process is converted into the esterification.

However, it is not necessary to wash out neutral salts which may be present in the free cellulose ether carboxylic acids prior to the esterification; the crude salts of cellulose ether carboxylic acids as they are obtained for instance from the reaction of alkali cellulose with salts of halogen carboxylic acids in moist condition, can also, to particular advantage, be used without further treatment as starting material for the method of the invention.

The reaction takes place in the cold, i.e. at temperatures below 20° C. and preferably below +10° C. The preferred temperature range is between 0 and −10° C. The preparation of the free cellulose ether carboxylic acid, the mixing of the acid with the alcohol and the inorganic acid and the adjustment of the desired temperature can be effected in any desired sequence. The free ether carboxylic acid or its salt is preferably introduced into the alcohol to which a corresponding quantity of acid has been added followed by cooling. The reaction mixture is then set aside. The molar quantity of alcohol to be used is at least equivalent to the quantity of ether carboxylic acid radicals present in the acid, but one generally employs excesses which are equal to at least 10 times and preferably 20 to 40 times this quantity.

The reaction mixture can be worked mechanically, for instance stirred, kneaded or pressed in while at rest or in motion prior to or during the reaction. The reaction also takes place without the use of such measures. The alcohol to which the acid has been added and which has been brought to the reaction temperature can also be caused to flow through the acid to be esterified and the water of reaction produced continuously discharged in this manner. In this way, there is obtained within short times of reaction an extensive esterification of the cellulose glycolic acid used. However, it is also possible to set the mixture aside for a relatively long period of time and thereupon to separate the alcohol and, should the esterification not yet have reached the desired degree, repeat the process as frequently as necessary. The esterification can for instance be interrupted when at least 40% and preferably 60 to 100% of the carboxyl groups present in the free cellulose ether carboxylic acid have been esterified.

The properties of the esters obtained are dependent on the degree of substitution, the extent of the esterification and the alcohol employed. If there has been used for instance a cellulose ether glycolic acid of an average degree of substitution of 0.5 to 0.8, such is available on the market in the form of its salts, and if it is esterified with a lower monovalent alcohol, for instance ethyl, methyl or isopropyl alcohol, the products of the process are insoluble in water and in organic solvents regardless of the degree of substitution or esterification.

This property can be made use of in the working up of the products, particularly if the starting materials still contain the salts coming from the preparation of the cellulose ether carboxylic acids. If, however, free carboxyl groups are still present in the products of the reaction, they can be converted into the corresponding salts by careful neutralization, for instance by treatment with equivalent quantities of caustic soda solution, caustic potash solution, ammonia, lower organic amines, particularly alkylol amines or other suitable substances having an alkaline reaction. These salts are swellable or soluble in water, depending upon the quantity of neutralized ester groups present per cellulose unit. The soluble salts distinguish themselves from the salts of non-partially esterified cellulose ether carboxylic acids with a corresponding quantity of neutralized carboxyl groups by greater resistance to precipitating agents, among which there are to be understood in particular salts of polyvalent metals such as salts of calcium, aluminum or iron. It is possible, by gradating the degree of esterification and by complete or partial neutralization of the non-esterified carboxyl groups with any desired bases to obtain any intermediate state between solubility, swellability and insolubility.

If cellulose ether carboxylic acids of a higher degree of substitution are employed, the properties of the acids used as starting material change with the esterification in a manner similar to that which was described in connection with a cellulose ether carboxylic acid of a medium degree of substitution. The properties of the esters also change when the cellulose ether carboxylic acids are esterified with polyvalent alcohols. If the cellulose ether carboxylic acids are reacted with alcohols of higher molecular weight, the esters obtained are swellable or soluble in organic solvents.

The cellulose ether carboxylic acids to be employed may contain further ether-linkage and particularly non-acid substituents on the glucose radical which have for instance 1 to 3 carbon atoms, such as methoxy, ethoxy, glycol ether or glycerine ether groups. The number of substituents directly bound to the glucose radical can assume any desired values between 0 and 3—$n$, where $n$ is the degree of substitution referred to ether carboxylic acid radicals. The esterification reaction is not essentially influenced by this; on the other hand, a possibly increased swellability or solubility in water should be taken into consideration in the preparation of the free acids and when washing salts out of the free acids or their esters. In these cases mixtures of water with water soluble organic solvents, particularly lower alcohols are used for the washing.

The water-insoluble reaction products or their water soluble salts may be used for instance as adhesives, binders, thickeners, protective colloids and many other purposes. They are furthermore suitable—as are the insoluble products of the process—as intermediates for the further working and production of other derivatives of cellulose ether carboxylic acids.

The physical properties of the ether carboxylic acids used and of the esters obtained which are given in the examples have been converted to anhydrous products.

*Example 1*

100 parts by weight of a fibrous cellulose glycolic acid having a degree of substitution of about 0.6 to 0.7 and properties determined by analysis of acid number=167.7, saponification number=177.9, moisture=9.2%, and an ash content of 1.04% are introduced into 2000 parts by weight of a solution of 120 parts by weight gaseous hydrogen chloride in 1880 parts by weight 98% technical methyl alcohol at a temperature of $-10°$ to $-5°$ C., with cooling.

The cellulose glycolic acid, which experiences only a slight swelling, is left in the methyl-alcoholic HCl for 48 hours at $-5°$ C., and thereupon freed from the alcohol by squeezing. The ester is thereupon washed free of chlorine ions with 50% aqueous methyl alcohol and thereupon treated three times with portions of 98% methyl alcohol of 1000 parts by weight each. Dried in air, there are obtained 92 parts by weight methyl cellulose glycolate (acid number=3.9, saponification number=186.4, ash=0.28%, moisture=4.7%). The ester is fibrous and insoluble in water and organic solvents.

*Example 2*

200 parts by weight of a reaction product of sodium cellulose with sodium chloroacetate which had been dried at 45° C. in a vacuum drying cabinet and contains about 52% ash-free cellulose glycolic acid and 11.3% water, and has a degree of reaction of about 0.7, were introduced at $-5°$ to $-10°$ C. into 2,140 parts by weight of a solution of 138 parts by weight of hydrogen chloride in 2,000 parts by weight of 98% technical methyl alcohol. After standing for 67 hours at $-10$ to $0°$ C., the non-swollen fibrous product was freed from alcohol by squeezing and thereupon washed free of chlorine ion with 10,000 parts by weight of water of 12° C., in which connection the methyl cellulose glycolate is not dissolved. The water is removed by washing with 3,000 parts by weight of 98% methyl alcohol or by drying in a vacuum drying cabinet.

There were obtained 115 parts by weight methyl cellulose glycolate (acid number=7.0, saponification number=186.2, moisture=4.8%, ash=0.38%). The fibrous ester is insoluble in water and organic solvents.

*Example 3*

30 parts by weight cellulose glycolic acid having a degree of substitution of 0.7 to 0.8, 14.2% moisture, acid number=187.5 and saponification number=206.0, were reacted with 500 parts by weight of a mixture of 475 parts by weight methyl alcohol and 25 parts by weight 70% perchloric acid for 40 hours at $-5°$ C. The mixture of perchloric acid and methyl alcohol is squeezed off and the cellulose glycolate is again set aside for 15 hours at $-5°$ C. with 500 parts by weight of the above mixture of methyl alcohol and perchloric acid. After the squeezing off of the alcohol-acid mixture, the methyl ester is washed twice with equal portions of 1,000 parts by weight each of 50% methyl alcohol and thereupon four times with portions of 500 parts by weight each of 98% methyl alcohol.

31 grams methyl cellulose glycolate were obtained (acid number=7.6, saponification number=197.2, moisture=10.1%).

*Example 4*

50 parts by weight cellulose glycolic acid having a reaction degree of 0.8, 12.5% moisture, 0.23% ash are introduced at $-10°$ to $-5°$ C. into 500 parts by weight of a mixture of 470 parts by weight n-octanol and 30 parts by weight HCl prepared with cooling, and thereupon set aside at 0 to −10° C. for 20 hours. The solution of HCl in octyl alcohol is pressed off and the residue is again set aside with the same quantity of freshly prepared HCl-octanol solution for 8 hours at 0 to −10° C. The pressing off and setting aside with HCl-octanol solution is repeated four times. The acid number of the ester obtained is then 10 or less. Thereupon it is washed with 98% methyl alcohol, and after drying there are obtained 54 parts by weight water-insoluble octyl cellulose glycolate (acid number=11.2, saponification number=13.9%).

*Example 5*

50 parts by weight cellulose glycolic acid having a degree of substitution of 0.6 to 0.8 (12.1% moisture, acid number=155.8, saponification number=201.8, 0.23% ash) are introduced at 0 to −10° C. into 504 parts by weight of 6.7% n-butanol HCl. The cellulose glycolic acid swells only slightly and is set aside therein at −5° C. for 72 hours, the n-butanol HCl being changed six times. Thereupon it is pressed off in the cold from the acid alcohol and the ester is washed free of acid with six portions of 300 cc. each of 98% methyl alcohol.

There are obtained 52 parts by weight butyl cellulose glycolate (13.5% moisture, saponification number =193.0).

*Example 6*

25 parts by weight of fibrous cellulose glycolic acid having a degree of substitution of 0.6 to 0.7, 12.1% moisture, saponification number=181.0 and 0.57% ash, are introduced into 400 parts by weight 4% n-propanol HCl at temperatures below 0° C. and set aside at this temperature. After about 30 hours, the acid propyl alcohol is pressed off and the partially esterified product is again esterified with the same quantity of 4% n-propanol HCl. After a total of 60 hours, the solution of HCl in the alcohol is pressed off and washed with three portions of 1,000 parts by weight of acetone each. 23 parts by weight of propyl cellulose glycolate are obtained, moisture=13.4, saponification number=193.0 and low acid number. The fibrous ester is insoluble in water and alcohols.

*Example 7*

The sodium salt of a cellulose glycolic acid having a degree of substitution of 1.3 to 1.4 is prepared from cotton linters by reacting twice with 19% caustic soda solution and sodium chloroacetate, whereupon the salt produced is washed with methyl alcohol. 100 parts by weight of this fibrous sodium cellulose glycolate are introduced at +10 to −10° C. into 500 parts by weight of 69% by weight of methanol HCl and set aside for 21 hours at about 0 to −5° C. The acid-containing methyl alcohol was pressed off and the residue washed three times with identical portions of 500 parts by weight 50% methyl alcohol and then three times with portions of 500 parts by weight of 98% methyl alcohol each. After the drying, there were obtained 84 parts by weight of partially esterified product (13.6% moisture, acid number=151.0, saponification number=298.0, ash=2.05%).

The partial ester can be converted into its partial salts by neutralization with equivalent quantities of salt-forming basic substances.

I claim:

1. A method of preparing esters of cellulose ether carboxylic acids which comprises reacting cellulose ether carboxylic acids having 2 to 4 carbon atoms in the ether carboxylic acid radical with an excess of a member selected from the group consisting of saturated, unsubstituted aliphatic monohydric alcohols having from 1 to 8 carbon atoms in their molecules in the presence of a strong inorganic acid as esterification catalyst at a temperature between −10° and 20° C. and recovering the esterification product.

2. Method according to claim 1, in which said reaction is carried out at a temperature between 0 and −10° C.

3. Method according to claim 1, in which said alcohol is present in an amount at least 10 times that quantity theoretically necessary to esterify all of the free carboxyl groups.

4. Method according to claim 1, in which the cellulose ether carboxylic acids are admixed with quantities of the crude salts of cellulose ether carboxylic acids, from which the cellulose ether carboxylic acids were prepared.

5. Method according to claim 1, in which said aliphatic hydrocarbon alcohol contains from 1–6 carbon atoms in the molecule.

6. A method of preparing esters of cellulose ether carboxylic acids which comprises reacting cellulose ether carboxylic acids having 2 to 4 carbon atoms in the ether carboxylic acid radical with an excess of a number selected from the group consisting of methyl, propyl, butyl and octyl alcohols in the presence of a strong inorganic acid as esterification catalyst at a temperature between −10° and 20° C. and recovering the esterification product.

References Cited in the file of this patent

UNITED STATES PATENTS

| | | |
|---|---|---|
| 2,098,336 | Dreyfus | Nov. 9, 1937 |
| 2,113,293 | Dickey | Apr. 5, 1938 |
| 2,459,108 | Lolkema | Jan. 11, 1949 |

FOREIGN PATENTS

| | | |
|---|---|---|
| 343,521 | Great Britain | Feb. 20, 1931 |
| 578,067 | Great Britain | June 13, 1946 |